Oct. 15, 1963

J. T. HILL ET AL 3,107,189

PROCESS FOR MAKING PROSTHETIC LIMBS

Filed Aug. 31, 1961

INVENTORS
James T. Hill
Fred Leonard

BY George F. Westerman

ATTORNEY 3,107,189
PROCESS FOR MAKING PROSTHETIC LIMBS
James T. Hill, Silver Spring, and Fred Leonard, Bethesda, Md., assignors to the United States of America as represented by the Secretary of the Army
Filed Aug. 31, 1961, Ser. No. 135,382
3 Claims. (Cl. 156—212)
(Granted under Title 35, U.S. Code (1952), sec. 266)

The invention described herein may be manufactured and used by or for the Government for governmental purposes without the payment of any royalty thereon.

This invention relates to a process for the preparation of smooth surfaced porous laminates and more particularly to a process for the application of smooth surfaced porous laminates to the preparation of artificial limbs.

An object of this invention is to provide a practical process for the preparation of laminates in the shape of a desired contour with a smooth surface appropriate to cosmetic application.

A further object of this invention is to provide, in the application of smooth surfaced porous laminates to prosthetics, a method of adaptation to substantially tubular configurations, as in the utilization for prosthetic limbs.

A further attribute of this process is that it makes easily possible the preparation of porous laminates which have severe undercuts.

A still further object of this invention is to permit the fabrication of laminates of dimensional fidelity.

The fabrication of porous laminates of general application is disclosed in the prior art as exemplified in Patent No. 2,959,822 to Eric Maurice O'Conor Honey et al. However, it is the application of this general process to substantially tubular form, and more particularly to the preparation of prosthetic limbs, which is the essence of this invention. Where cosmetic application of such a process is intended, the utilization of a calender (in the Honey et al. patent) for smoothing the outer surface is impractical.

Briefly, this invention comprises the steps of applying a plastic membrane to a substantially cylindrical mold, pulling a number of layers of stockinet over the thin plastic membrane, impregnating the stockinet with a resin mixture containing a solvent such as trichloroethylene which will, during the precuring stage, evaporate, leaving the laminate porous, and pulling a tightly tailored plastic bag snugly over the partially gelled laminate. The last described step causes the porous laminate to assume an extremely smooth surface. With the plastic sleeve still on the laminate, the laminate is cured, after which the plastic covering is removed and the laminate is post cured. After cooling the laminate, it is removed from the mold in the internal plastic membrane and stripped therefrom, leaving an equally smooth interior surface.

Figure 1:
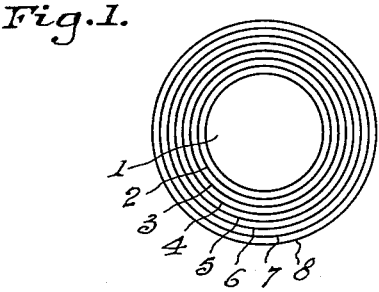
Figure 2:
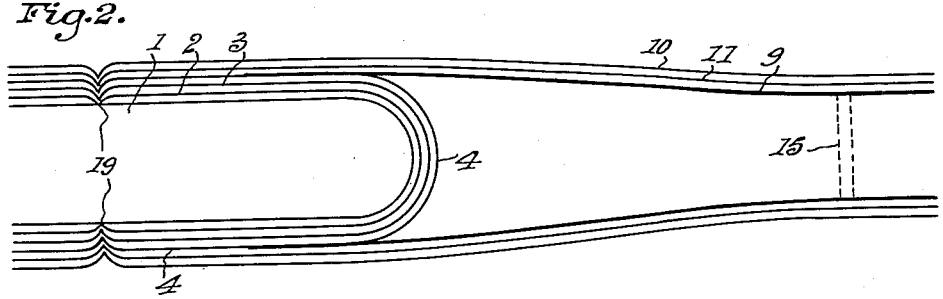
Figure 3:
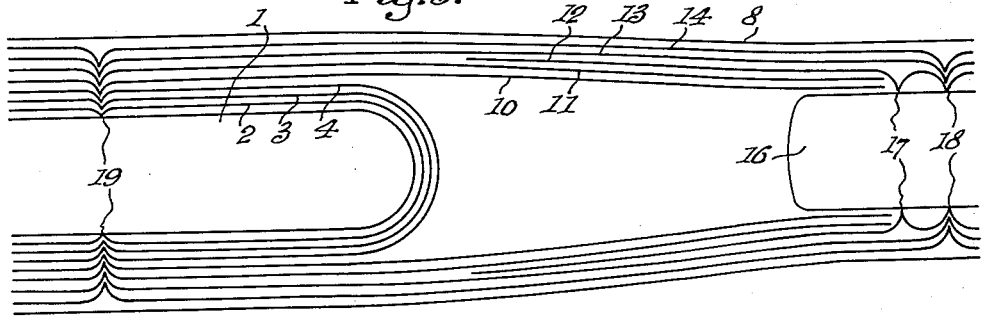
Figure 4:
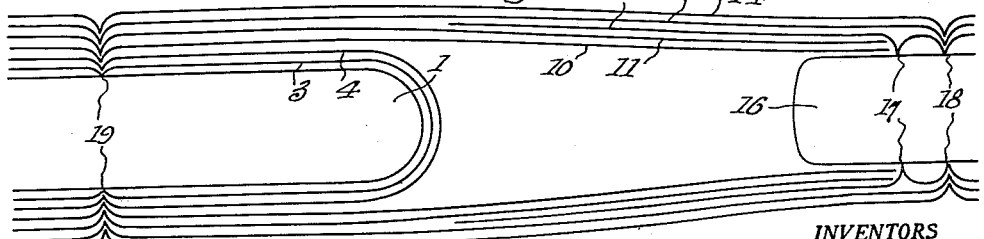

Other objects and advantages of this process will appear in the description of the drawings wherein:

FIG. 1 is a schematic cross section of a generalized application of this process; and FIGS. 2–4 show schematic longitudinal sections of various stages of the specific application of this invention to prosthetic use.

Referring in detail to the schematic general application shown in FIG. 1, positive form 1, prepared according to the desired shape of the laminate, is covered with a suitable laminating resin release agent. Any membrane or coating which is nonadhesive to the laminating resin may be used. Materials satisfying this requirement include vinyl halide polymers, polyethylene, cellulose acetates, cellulose acetates butyrates, and polyvinyl acetates to name but a few. However, in the embodiment, polyvinyl alcohol having been found most satisfactory, has been used to form sleeve 2. Over sleeve 2 is pulled sleeve 3 of tubular closely knit stockinet preferably of nylon continuous filament stretched yarn of a denier of about 160. Three more layers of regular orthopedic nylon tubular stockinet are then pulled over the form to constitute sleeves 4, 5, and 6, respectively. Following the addition of sleeve 6 to the form, a final layer of stockinet of close weave (as described for sleeve 3) is tied over the 3 layers of orthopedic stockinet. This final layer constitutes sleeve 7. Sleeves 3–7 constitute the "lay up." The lay up is then ready for the application of a resin mixture, which may be any suitable resin imparting the necessary strength for the proposed usage of the laminate. For prosthetic use, an epoxy resin mixture has been found quite satisfactory. This embodiment incorporates an epoxy resin mixture containing the following commercially available components:

| | G. |
|---|---|
| ERL 2795 | 65 |
| Versamid 125 | 35 |
| Trichloroethylene | 44 |

Pigmenting if desired.

Erl 2795 is a trademark for a liquid low viscosity (500 to 900 cps.) epoxy resin with an epoxide equivalent of 179–194 and an average molecular weight of 340–400. Versamid 125 is a trademark for a long chain polyamine curing agent and more specifically a condensation polymer of dimerized (and trimerized) vegetable oil, unsaturated fatty acids, and aryl or alkyl polyamines, having an amine value of 290–320.

Trichloroethylene is a low toxicity and noninflammable solvent which through subsequent evaporation will leave interstitial openings in the stockinet layers thus incorporating the porous quality to the laminate. Other solvents, producing varying degrees of porosity are toluene, xylene, methyl-isobutyl ketone, acetone, benzene, methyl-ethyl ketone, perchloroethylene, methyl alcohol, isopropyl alcohol, chloroform, 1,1,2-trichloroethane, and carbon tetrachloride.

The ingredients, having been stirred well, are then painted on the lap up until it is thoroughly impregnated. Excess resin is strung out by firm strokes against the stockinet with string.

When visible excess resin has been eliminated, the lay up is precured in an oven at from 45–50° C. for 30–45 minutes. Procuring of epoxy resin is known in the art and suffice it to say that different temperatures may be utilized for precuring provided the time is proportionally and inversely varied. As stated above the trichloroethylene will evaporate during this precuring cycle.

After precuring a polyvinyl sleeve 8, which has been tailored to a truncated conical shape is pulled snugly over the wet partially gelled lay up. It is this step in the process which is considered to be critical and which enables a molding of a very smooth surface and contour even permitting areas where undercuts are present. At this point the gelling of the resin is sufficient to minimize the substantial flow of resin into the pores by the evaporated solvent. If excess uncured resin "pools," at this stage, it is strung out of the lay up.

The lay up, still enclosed in the polyvinyl alcohol sleeve 8, is then cured for 90 minutes at 100° C. during which time a slight shrinkage of the sleeve causes the impregnated laminate to assume an extremely smooth surface and contour. Sleeve 8 is removed and the lay up is post-cured for approximately 60 minutes at 100° C. The laminate is then cooled and removed from form 1. Sleeve 2 is removed from the interior of the laminate.

Laminates produced by the above described process have a lower compression strength, bearing strength and bursting strength than their nonporous counterparts.

However, the impact strength is somewhat greater than that of the nonporous laminates. The porosity of the above described laminate is such as to allow an average water passage rate of 5200 liters per minute per square meter of surface at a pressure head of 75 centimeters of water.

FIGURES 2, 3 and 4 show an application of the process described generally above, specifically to prosthetic limbs. Positive form 1 represents a plaster model of the amputee's stump. Over form 1 is stretched a moistened sheet 2 of polyvinyl alcohol, the ends of which are securely tied at the base or proximate end of the form. A sleeve of close knit nylon stockinet as described above, and shown as sleeve 3 of FIG. 2, is sewed in the shape of the contour of the distal portion of the stump, pulled over the stump (form 1) and tied at the base thereof (point 19). Layers of orthopedic stockinet forming sleeves 3 and 4 are then placed on the form in the same manner as described for the fitting of sleeve 2. In the embodiment shown only two layers of orthopedic stockinet are used; however, up to four layers may be utilized to increase the strength of the prosthetic limb.

A cone is then prepared which will serve as a form for the prosthetic limb. Cone 9 as shown in FIG. 2 can be made of a plastic, such as cellulose acetate, 5–10 mils thick, or any stable material which will not adhere to epoxy resin. The length of the cone overlapping the stump or form 1 will vary depending upon the type of the amputee being fitted. Cone 9 is placed over the stump, overlapping sleeve 4 to an appropriate degree depending upon the shape of the stump or form. After the wrist unit 16 has been fitted, the cone is then taped together with pressure sensitive tape not shown in the accompanying drawings. With the cone fitted over the stump lay up, two pieces of two-inch orthopedic stockinet, long enough to cover the cone and the base of the stump, are pulled onto the cone. A piece of pressure sensitive tape 15 is then placed around the wrist unit of the cone so that it extends approximately ⅜ inch beyond what is to be the distal end of the cone. Sensitive tape 15 is used to facilitate later trimming of the stockinet. The two sleeves of stockinet, 10 and 11, are now stretched to the base of form 1 where they are tied at point 19.

An epoxy resin mixture is then prepared of the following consistency:

| | G. |
|---|---|
| ERL 2795 or Epon 815 | 33 |
| Versamid 125 | 17 |
| Trichloroethylene (15 ml.) | 22 |
| Epoxy pigment | ½ |

Epon 815 is a trademark for a liquid epoxy resin with a viscosity of 500–900 cps., a molecular weight of 340–400 and an epoxide equivalent of 175–210. The epoxy pigment in the mixture shown above is stirred into the mixture before the addition of the trichloroethylene. The stockinet (sleeves 10 and 11) are then brush coated from a point just above the proximate end of the cone to the distal end of the cone. Application of the epoxy resin beyond the proximate end of the cone should be avoided as it may cause adherence of sleeves 10 and 11 to sleeves 3 and 4. This would, of course, create difficulties in removing the coated sleeves 10 and 11 together with cone 9, after curing of sleeves 10 and 11. After sleeves 10 and 11 are coated the excess epoxy resin is strung down as described above.

The entire lay up is then precured in an oven at 45–50° C. for 30 minutes. During this time the trichloroethylene will evaporate leaving sleeves 10 and 11 in a porous condition. The temperature is then increased to 100° C. and cured for an additional 30 minutes. After curing of sleeves 10 and 11, the coated lay up is then removed from form 1 and the cone is removed from the inside of sleeves 10 and 11. The distal end of sleeves 10 and 11 can then be trimmed. The uncoated stockinet at the proximal portion of sleeves 10 and 11 is not trimmed at this time. Wrist unit 16, shown in FIG. 3, is then placed in position by being pushed distally through the inside of the laminate.

One of the following resin mixtures may now be prepared, amounts shown to be depending upon the size of the laminate. These amounts are based upon that ordinarily required for forearm prosthetics.

Average:

| | G. |
|---|---|
| ERL 2795 or Epon 815 | 65 |
| Versamid 125 | 35 |
| Trichloroethylene (29 ml.) | 43 |
| Epoxy pigment paste | ½–3 |

Child's:

| | |
|---|---|
| ERL 2795 or Epon 815 | 48¾ |
| Versamid 125 | 26¼ |
| Trichloroethylene (22 ml.) | 32 |
| Epoxy pigment paste | ½–2 |

Large:

| | |
|---|---|
| ERL 2795 or Epon 815 | 97½ |
| Versamid 125 | 52½ |
| Trichloroethylene (44 ml.) | 64 |
| Epoxy pigment paste | 1–5 |

Sleeves 3 and 4, upon inner form 1 are now coated with the epoxy resin, the excess of which is strung down as previously described. Layers 10 and 11 (already impregnated and cured) are then placed over the uncoated form, the untreated proximate ends being again tied at the proximate end 19 of form 1. The position or setting of the wrist unit 16 should now be adjusted to assure its proper distance from the end of layers 10 and 11.

Sleeve 12 of close knit nylon stockinet, is then pulled over layers 10 and 11, so that the distal end extends beyond the ends of layers 10 and 11. The distal end of sleeve 12 is securely tied around the wrist unit 16 at point 17 and stretched proximally to eliminate wrinkles. Holding sleeve 12 firmly in position, additional stockinet sleeves 13 and 14, also of close knit nylon, are slipped over the lay up and tied distally at point 18 beyond the tie of sleeve 12 (point 17), a distance of approximately ½ inch. The proximal ends of the stockinet layers 13 and 14 are pulled proximally and secured at point 19 near the base of form 1.

The entire lay up is now brush coated with the remaining epoxy resin mixture and the excess resin is again strung down. The lay up is placed for precuring in an oven at 45–50° C. for 30 minutes during which time the solvent escapes from the laminate. Midway through the precuring step, it is advisable although not essential to again string down the laminate to insure high porosity. The lay up is removed from the oven and a polyvinyl alcohol sleeve 8, tailored to a truncated conical shape, is pulled snugly over the wet partially gelled lay up. Again, excess resin should be strung down. With the polyvinyl alcohol sleeve intact, the lay up is again heated for 90 minutes at 100° C.

Sleeve 8 is then removed and the lay up is postcured for approximately 60 minutes at 100° C. after which the laminate is permitted to cool. Form 1 is then removed by cutting through the laminate and form at the proximal end, and by knocking out the plaster stump model form 1. Sleeve 2 of polyvinyl alcohol on the inside of the laminate is removed and the edges are trimmed.

The laminate is now ready for final assembly as shown in FIG. 3. Prior to utilization it should be tested for porosity. This can be accomplished by immersing the laminate in water and observing whether the water seeps into the interior of the limb uniformly from all directions. Both the inner and outer surfaces of the laminate should be smooth and uniform.

We claim:

1. A process for the production of smooth surfaced porous laminated prosthetic limbs comprising the steps of vesting a stump model form with an inner coating of a laminating release agent; further vesting said stump model form with a plurality of stockinet sleeves; fitting said stockinet covered stump model form with a truncated substantially cone shaped limb form of a laminating release material, said limb form overlapping said stockinet covered stump model form; drawing a plurality of stockinet limb sleeves over said limb form and said stump model form; impregnating the portion of said limb sleeves immediately covering said limb form with an epoxy resin mixture containing a curing agent for said resin and a solvent selected from a group consisting of toluene, xylene, acetone, methyl-isobutyl ketone, benzene, methyl-ethyl ketone, trichloroethylene, carbon tetrachloride, perchloroethylene, methyl alcohol, isopropyl alcohol, and 1,1,2-trichloroethane; curing said epoxy resin; removing said sleeve coated limb form from said sleeve coated stump form; removing said limb form from the laminate thereon; positioning a terminal limb unit at the end of the limb laminate; impregnating said stump model form covering sleeves with said epoxy resin mixture; fitting said cured limb laminate on said sleeve covered and resin impregnated stump model form; tying said overlapping unimpregnated portions of said stockinet limb sleeves around said stump covering sleeves at the base of said stump model; covering the entire length of the prosthetic limb with an additional plurality of sleeves of stockinet; tying the ends of said additional stockinet coverings at both the proximate end of the prosthetic limb and at said terminal limb unit; impregnating said additional stockinet sleeves with said epoxy resin mixture; precuring said additional epoxy resin to a partially gelled state thereby evaporating said solvent; snugly covering the entire laminated prosthetic with an outer sleeve of polyvinyl alcohol; curing said epoxy resin; and removing said outer polyvinyl alcohol sleeve, said stump model form, and said stump inner laminating release coating.

2. A process for the production of smooth surfaced porous laminated prosthetic limbs comprising the steps of vesting a stump model form with an inner coating of a laminating release agent; further vesting said stump model form with a plurality of stockinet sleeves; fitting said stockinet covered stump model form with a truncated substantially cone shaped limb form of a laminating release material, said limb form overlapping said stockinet covered stump model form; drawing a plurality of stockinet limb sleeves over said limb form and said stump model form; impregnating the portion of said limb sleeves immediately covering said limb form with an epoxy resin mixture containing a curing agent for said resin and trichloroethylene; curing said epoxy resin; removing said sleeve coated limb form from said sleeve coated stump form; removing said limb form from the laminate thereon; positioning a terminal limb unit at the end of the limb laminate; impregnating said stump model form covering sleeves with said epoxy resin mixture; fitting said cured limb laminate on said sleeve covered and impregnated stump model; tying said overlapping unimpregnated portions of said stockinet limb sleeves around said stump covering sleeves at the base of said stump model; covering the entire length of the prosthetic with an additional plurality of sleeves of stockinet; tying the ends of said additional stockinet coverings at both the proximate end of the prosthetic and at the said terminal limb unit; impregnating said additional stockinet sleeves with said epoxy resin mixture; precuring said additional epoxy resin to a partially gelled state thereby evaporating said solvent; snugly covering the entire laminated prosthetic with an outer sleeve of polyvinyl alcohol; curing said epoxy resin; and removing said outer polyvinyl alcohol sleeve; said stump model form and said stump inner laminating release coating.

3. A process for the production of smooth surfaced porous laminated prosthetic limbs comprising the steps of vesting a stump model form with an inner coating of polyvinyl alcohol; further vesting said stump model form with a plurality of stockinet sleeves; fitting said stockinet covered stump model form with a truncated substantially cone shaped limb form of a laminating release material, said limb form overlapping said stockinet covered stump model form; drawing a plurality of stockinet limb sleeves over said limb form and said stump model form; impregnating the portion of said limb sleeves immediately covering said limb form with an epoxy resin mixture containing a curing agent for said resin and a solvent selected from a group consisting of toluene, xylene, acetone, methyl-isobutyl ketone, benzene, methyl-ethyl ketone, trichloroethylene, carbon tetrachloride, perchloroethylene, methyl alcohol, isopropyl alcohol, chloroform, and 1,1,2-trichloroethane; curing said epoxy resin; removing said sleeve coated limb form from said sleeve coated stump form; removing said limb form from the laminate thereon; positioning a terminal limb unit at the end of the limb laminate; impregnating said stump model form covering sleeves with said epoxy resin mixture; fitting said cured limb laminate on said sleeve covered and impregnated stump model; tying said overlapping unimpregnated portions of said stockinet limb sleeves around said stump covering sleeves at the base of said stump model; covering the entire length of the prosthetic with an additional plurality of sleeves of stockinet; tying the ends of said additional stockinet coverings at both the proximate end of the prosthetic and at the said terminal limb unit; impregnating said additional stockinet sleeves with said epoxy resin mixture; precuring said additional epoxy resin to a partially gelled state thereby evaporating said solvent; snugly covering the entire laminated prosthetic with an outer sleeve of polyvinyl alcohol; curing said epoxy resin; and removing said outer polyvinyl alcohol sleeve; said stump model form and said stump inner polyvinyl alcohol covering.

References Cited in the file of this patent

UNITED STATES PATENTS

| | | |
|---|---|---|
| 2,845,379 | Bey | July 29, 1958 |
| 2,976,889 | Cannady | Mar. 28, 1961 |

FOREIGN PATENTS

| | | |
|---|---|---|
| 761,046 | Great Britain | Nov. 7, 1956 |
| 795,991 | Great Britain | June 4, 1958 |

OTHER REFERENCES

Epoxy Resins, Lee-Neville, 1957, McGraw-Hill, pp. 234–240 relied on.